Figure 11A:
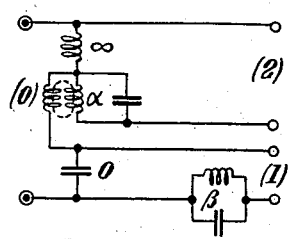

July 6, 1937.  W. CAUER ET AL  2,085,953
ELECTRIC FILTER
Filed May 4, 1936  3 Sheets-Sheet 1
Fig. 1a  Fig. 2a  Fig. 3a  Fig. 4a
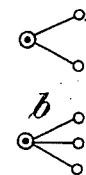 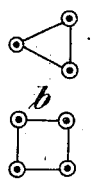 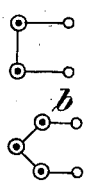 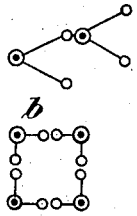
Fig. 5a  Fig. 6a  Fig. 7a
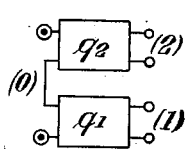 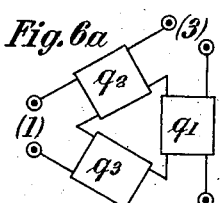 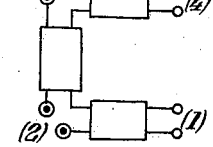
Fig. 5b  Fig. 6b  Fig. 7b
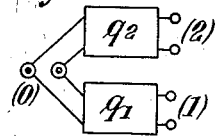 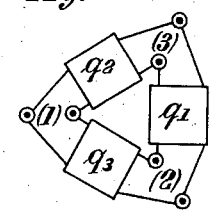 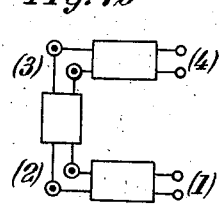
Fig. 8a  Fig. 8b  Fig. 9a  Fig. 9b
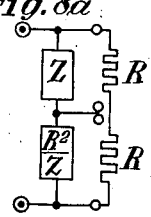 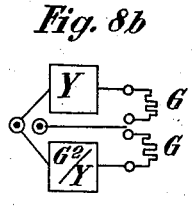 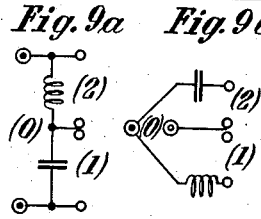
Fig. 10a  Fig. 10b
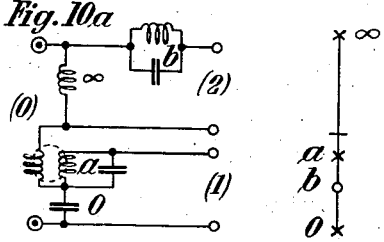 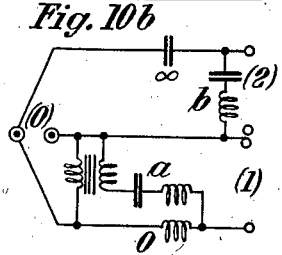
Inventors:
Walter Brandt
Wilhelm Cauer
by David Rines
Attorney July 6, 1937.  W. CAUER ET AL  2,085,953
ELECTRIC FILTER
Filed May 4, 1936  3 Sheets-Sheet 2

Inventors:
Walter Brandt
Wilhelm Cauer
by David Rines
Attorney

July 6, 1937.  W. CAUER ET AL  2,085,953
ELECTRIC FILTER
Filed May 4, 1936  3 Sheets-Sheet 3

Inventors:
Walter Brandt
Wilhelm Cauer
by David Rines
Attorney

Patented July 6, 1937

2,085,953

UNITED STATES PATENT OFFICE 2,085,953

ELECTRIC FILTER

Wilhelm Cauer, Kassel, and Walter Brandt, Berlin, Germany

Application May 4, 1936, Serial No. 77,814
In Germany April 6, 1934

18 Claims. (Cl. 178—44)

The present invention relates to electric-wave filters, and more especially to filters provided with three or more pairs of terminals. The invention is particularly related to filters of the above-described character in which one or more pairs of terminals are designed to exchange energy simultaneously with two or more other pairs of terminals in their respectively different transmission ranges of frequency (separating filter).

Filters are known to the art that are each constituted of several four-terminal filters. Reactance filters of well known type may, for example, be connected directly in series or parallel at one side of the composite filter. Because of the mutual distortion of the separate filters that go to make up such a composite filter, however, the transmission ranges of the composite filter are poor and its reflection is large. The difficulty may be overcome by the use of vacuum tubes, but this introduces new difficulties caused by the lack of linearity of the vacuum tubes and by the suppression of one of the directions of communication. It is possible, also, instead of using vacuum tubes, to connect the separate filters over attenuation sections, or to employ filters of constant image impedance, but this results in great loss of energy.

Filters have accordingly, more recently, been proposed that are constituted of a bridge system comprising filters reciprocal in pairs connected together, in the form of a cascaded chain or ladder. As each such bridge contains at least two filters of equivalent efficiency, the attenuation of which is not additive in the attenuation range, the number of necessary elements becomes greatly increased by this proposal; furthermore, each bridge of such a composite filter filters only a single range of frequencies.

An object of the present invention is to provide a new and improved filter of the above-described character.

A further object is to provide a new and improved composite filter the constituent filters of which are themselves novel and are connected in a novel manner. To save circumlocution of language, such constituent filters of the composite filter will hereinafter be referred to as filter sections.

Another object is to provide a new and improved, very compact filter, that shall be constituted of relatively few circuit elements, and that shall be simple and cheap to construct and highly efficient in operation.

Still another object is to provide a filter that is so flexible that it may be so designed as to solve almost any filter problem, even problems relating to properties in the pass ranges, and this without suppressing either direction of communication and without appreciable loss of energy.

Still a further object is to provide a novel filter of the above-described character having special advantages when considered from the point of view of attenuation or phase.

Still another object is to provide a novel filter of constant impedance.

Another object is to provide a novel filter of the above-described character (separating filter) particularly adapted for use in communication engineering.

As explained by W. Cauer, for example, in "Ein Reaktanztheorem", Sitzungsberichte der Preussischen Akademie der Wissenschaften, Math. Phys. Klasse, 1931, and "Aequivalenz von 2n-Polen ohne Ohmsche Widerstände", Göttinger Nachrichten, 1934, Math. Phys. Klasse, Fach-gruppe I, Band 1, No. 1, the solution of filter problems such as are discussed above depends, in the present state of knowledge, more upon the frequency characteristics that a filter shall have than upon the structure of the filter. It is only when the said frequency characteristics are prescribed, and not necessarily when the filter structure is defined, that it is now possible to design the filter; it is then possible to build not only one filter, but also all other possible networks that are equivalent to such filter. Among further objects of the present invention, however, are to provide a novel composite filter the individual filter sections of which compose the composite filter have also novel structures; also to provide for the use of such individual filter sections of difficult design; and also to provide for the use of such simpler individual filter sections, combined with each other or with other filter sections.

Another object of the invention is to provide a composite filter of the above-described character (separating filter) having three or more pairs of terminals the filter having characteristics, such as open-circuit or short-circuit impedances, that are approximately reciprocal to each other at every two pairs of terminals in the attenuation ranges and approximately proportional to each other in the pass-band ranges.

Other and still further objects will be explained hereinafter, and will be particularly pointed out in the appended claims, it being understood that it is intended, by suitable expressions in the claims, to specify all the novelty that the invention may possess.

Figure 15:
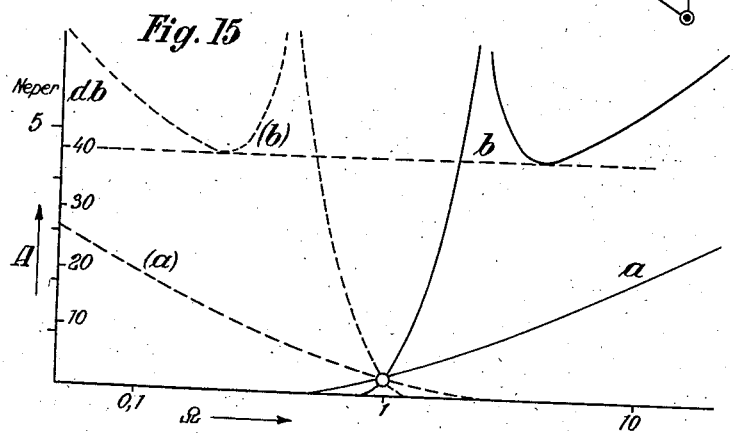
Figure 16:
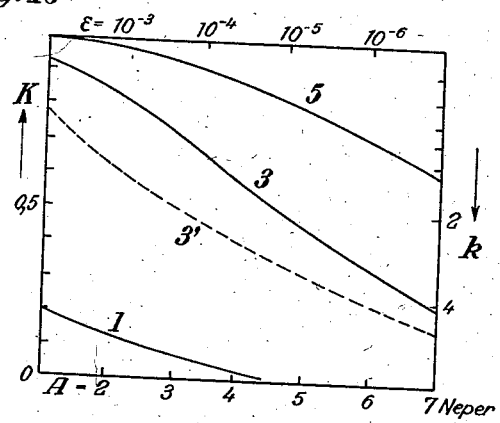
Figure 17:
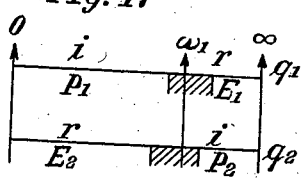
Figure 18:
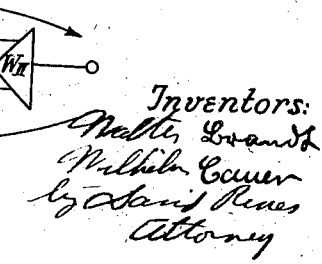

The invention will now be explained more fully in connection with the accompanying drawings, in which Fig. 1a is a diagrammatic view illustrating a filter embodying the present invention, this filter being of a type that will hereinafter be referred to as the "split" or "split-filter" type; Fig. 1b is a similar diagrammatic view of another split filter embodying the present invention; Figs. 2a and 2b are diagrammatic views similar to Figs. 1a and 1b, respectively, illustrating filters embodying the present invention that will hereinafter be referred to as of the "ring" or "ring-filter" type; Figs. 3a and 3b are diagrammatic views similar to Figs. 1a and 2a, and Figs. 1b and 2b, respectively, illustrating "open-ring"-filter types constructed in accordance with the present invention; Fig. 4a is a diagrammatic view illustrating a composite filter having a plurality of pairs of terminals and comprising a cascade connection of simple split filters having several pairs of terminals such as are illustrated by Fig. 1a; Fig. 4b is a diagrammatic view illustrating a similar composite filter comprising a plurality of split filters such as are illustrated by Fig. 1a cascade-connected into a ring filter; Fig. 5a is a diagrammatic view illustrating a composite filter embodying the present invention comprising a plurality of single four-terminal network sections so connected together in series that there shall be as many four-terminal networks at each pair of terminals as there are ways of communication; Fig. 5b is a similar diagrammatic view illustrating a similar composite filter, but with the said four-terminal networks connected in parallel; Figs. 6a and 7a are modifications of the filter shown in Fig. 5a, and Figs. 6b and 7b are modifications of the filter shown in Fig. 5b; Fig. 8a is a diagrammatic view similar to Fig. 5a of a prior-art circuit; Fig. 8b is a diagrammatic view similar to Fig. 5b of another prior-art circuit; Fig. 9a is a diagrammatic view illustrating a special case of the circuit shown in Fig. 8a; Fig. 9b is a diagrammatic view illustrating a special case of the circuit shown in Fig. 8b; Fig. 10a is a diagrammatic view similar to Fig. 5a and Fig. 10b is a diagrammatic view similar to Fig. 5b of filters embodying the present invention, Fig. 10 containing, also, on a suitable scale of frequency, a diagrammatic representation of the order of the resonance frequencies; Figs. 11a, 11c, 12a, 13a and 14a are diagrammatic views similar to Fig. 10a, and Figs. 11b, 11d, 12b, 13b and 14b are diagrammatic views similar to Fig. 10b of modified filters embodying the invention, Figs. 11, 12, 13 and 14 containing also a diagrammatic representation of the order of resonance frequencies similar to that of Fig. 10; Fig. 15 is a diagrammatic view showing curves of the attenuation characteristics of split filters such as are illustrated in Figs. 9 and 12, plotted as a function of a normalized frequency in logarithmic units, the working attenuation from the pair of terminals 0 to the pair of terminals 1 being shown in full lines, and that to the pair of terminals 2 being shown in dashed lines; Fig. 16 is a similar plot of auxiliary curves useful to the design of separating filters according to the present invention; Fig. 17 is a further auxiliary diagram; and Fig. 18 is a diagrammatic view illustrating one of many multiplex communication systems that may embody the present invention.

The present invention relates, in the main, to the provision of separating filters of the split, ring and open-ring types, illustrated more particularly in Figs. 1a, 1b, 2a, 2b, 3a and 3b; and especially to the type that is probably the most important of these,—the split filters. This classification of filters is of value as indicating different ways in which communication may be rendered possible between the pairs of terminals of the separating filters. The invention is not, however, restricted entirely to the use of filters of the split, ring or open-ring types.

In Figs. 1 to 4, inclusive, each pair of terminals is represented by a small circle and ways of communication between pairs of terminals by a line. A similar notation is used in Figs. 5 to 14, inclusive, where, however, two circles correspond to each pair of terminals. These ways of communication are usually ways along which communication may be had in opposite directions. Some of the circles are shown provided with a central dot, to indicate that two or more ways of communication may issue from the pair of terminals represented thereby; such a pair of terminals may be referred to as a "main pair of terminals". Each pair of terminals from which only a single way of communication issues may be termed a "secondary pair of terminals".

Four-terminal filter sections may be employed, as illustrated in Figs. 5 to 7; they are not like the corresponding networks of the prior art, because they are not themselves complete filters, in the usual sense of that term; on the contrary, they are incomplete filters, several of their circuit elements, the presence of which would be necessary to supply characteristics such that the networks could serve as complete filters over the pass band being omitted, for the sake of economy. The circuit elements of a filter section being omitted are to be found, what belongs to the efficiency, in the remaining filter sections of the complete separating filter.

Fig. 8a illustrates a network that looks like that of Fig. 5a, but with the four-terminal networks thereof degenerated, as a special case, into two two-terminal, impedance networks Z and $$\frac{R^2}{Z}$$

one being the reciprocal of the other. Fig. 8b similarly illustrates a network that looks like that of Fig. 5b, with two similar degenerated admittance or conductance reciprocal two-terminal networks Y and $$\frac{G^2}{Y}$$

Figs 8a and 8b represent, respectively, a complex potentiometer and a dual complex current-divider, familiar types of which will be recognized in the high-and-low-frequency networks of Figs. 9a and 9b, respectively. Networks of this kind can obviously have but a very slight filter effect, as is obvious from the curve a of Fig. 15, which is the attenuation curve corresponding to the networks of Figs. 9a and 9b.

In the filter networks of Figs. 5 to 7, as before stated, however, the individual filter sections are not complete filters, as they lack circuit elements the presence of which would be necessary to complete the individual filters. The absence of such circuit elements is compensated for by the presence of other circuit elements that may be requisite to the production of the required efficiency, in other four-terminal networks of the complete composite filter. A feature of the present invention thus contemplates the provision of network sections that are not themselves complete filter sections, but that may be combined together to produce a complete, composite filter. It is thus rendered possible, in accordance with the present invention, to construct a composite filter with less circuit elements than would be required if the composite filter were constituted of filter sections that are complete in themselves for their individual efficiencies, such composite filters, at the same time, having improved characteristics in the pass bands.

The contrast between the present invention and the prior art will be understood from a comparison of Fig. 8 or 9 with Figs. 10 to 14. In those figures, the separating filters, shown at $a$ and $b$, are reciprocal to each other; and the coils that are shown linked together by dotted-line circles are assumed to be tightly coupled, which may be effected by, for example, constructing them in toroidal form with two windings; and those transformers the cores of which are indicated by three lines are ideal transformers.

The diagrammatic scale of frequencies between Fig. 10$a$ and Fig. 10$b$ shows at a glance where the impedance ($a$) or the admittance ($b$) of the correspondingly designated oscillation circuit approaches infinity. As in the case of the complex potentiometer of Fig. 9$a$, the impedance at the main pair of terminals of Fig. 10$a$, if the secondary pairs of terminals are closed by means of the network R or G, is real and is independent of frequency, but the filtering action is enormously improved. With networks such as illustrated in Fig. 12, for example, an attenuation characteristic may be obtained such as is illustrated by the curve $b$ of Fig. 15, assuming an attenuation of 4.6 napiers or 40 decibels.

Figs. 10 to 13, inclusive, illustrate low-and-high-pass filters of the split type. Fig. 14, on the other hand, illustrates a composite filter of the most simple ring type. As in the case of the before-mentioned complex potentiometer of Fig. 8$a$, its four-terminal network sections, which are not themselves, however, in this case, complete filters, are degraded into two-terminal filters. They are designed to transmit, between the terminals 2 and 3, 3 and 1 and between the terminals 1 and 2, chiefly low, medium and high frequencies respectively, but they have, of course, only a very small filter effect. As in the case of the split filters, however, it is possible to design more complicated ring filters that shall be more efficient filters.

It is now in order to discuss certain matters of theory.

The characteristics of passive networks with $n+1$ pairs of terminals 0, 1, ... $n$ are suitably determined from their impedance matrices Z or their admittance matrices Y, which may be obtained from the system of coefficients of the following equations between the currents $J_s$ and the voltage $E_s$ at the various pairs of terminals:

(1) $$E_s = \sum_{t=0}^{n} Z_{st} J_t$$

and (2) $$J_s = \sum_{t=0}^{n} Y_{st} E_t$$

where
$$s = 0, 1, \ldots n$$
$$Z_{st} = Z_{ts}$$

and
$$Y_{st} = Y_{ts}$$

As an illustration, $Z_{ss}$ is the open-circuit impedance, and $Y_{ss}$ the short-circuit admittance, at the pair of terminals $s$. When Equations (1) and (2) both exist, which is usually the case, it is also true that
$$ZY = 1$$

It is possible to determine, and also to measure, these equations, as well as their matrices, by known methods, if one of the networks is given.

If the matrix of the resistances terminating the network be further denoted by (3) $$R = \begin{Vmatrix} R_0 & 0 & \cdots & 0 \\ 0 & R_1 & \cdots & \vdots \\ \vdots & & & \vdots \\ 0 & \cdots & & R_n \end{Vmatrix}$$

the determinant of any matrix X by $|X|$, and the minor of the determinant corresponding to the element $X_{st}$ by $|X_{st}|$, the most important working parameters of the filter network may be clearly expressed as follows, bearing in mind that $J'$ represents the standard or comparison current that is driven through the receiver $R_s$ by the normal transmitter having an inner resistance $R_s$, and $J_0, \ldots J_n$ represent the currents that are driven by the same transmitter, when connected in shunt to the network at the terminals $s$, through the receivers $R_0 \ldots R_n$:

The working impedance $W_s$, which is the apparent impedance of the network at the terminals $s$, assuming that the other pairs of terminals are closed, with their respective receivers, may be represented by the formula:

(4) $$W_s = \frac{|Z+R|}{|Z+R|_{ss}} - R_s$$

The working attenuation may be represented by (5) $$A_{st} \equiv \ln \sqrt{\frac{R_s}{R_t}} \left| \frac{J_s'}{J_t} \right| = \ln \left| \frac{1}{2\sqrt{R_s R_t}} \left| \frac{Z+R}{Z+R} \right|_{st} \right|$$

This working attenuation is often conveniently separated into its input attenuation and its transmitting attenuation:

(5') $$A_{st} = A_s + \overrightarrow{A_{st}}$$

The input attenuation may generally be represented by (6) $$A_s \equiv \ln \left| \frac{J_s'}{J_s} \right| = \ln \left| \frac{R_s + W_s}{2 R_s} \right|$$

For the most important filter networks, embodying the present invention, furthermore, the split filters, in relation to the main pair of terminals, the transmitting attenuation may be represented by (7) $$\overrightarrow{A_{0t}} \equiv \ln \sqrt{\frac{R_0}{R_t}} \left| \frac{J_0}{J_t} \right| = \ln \frac{1 + \frac{Z_{tt}}{R_t}}{\frac{Z_{0t}}{\sqrt{R_0 R_t}}}$$

and the transmitting phase by (8) $B_{0t} \equiv$ the imaginary part of $\left( \ln \frac{J_0}{J_t} \right) = \tan^{-1} \frac{R_t}{i Z_{tt}}$ The open-circuit image impedance $\overrightarrow{W_{st}}$ is also important. This is the characteristic impedance of a complete network having the four-terminal network provided with the pairs of terminals $s$ and $t$, measured at the terminals $s$ when the remaining pairs of terminals of the complete network are opened.

(9) $$\overrightarrow{W_{st}} = \sqrt{\frac{Z_{ss}}{Z_{tt}} (Z_{ss} Z_{tt} - Z^2_{st})}$$

An additional set of equations similar to Equations (3) and (9) may be written down, substituting for the impedance Z the admittance Y, for the current J the voltage E, the resistances R by the admittances G, open circuits by short circuits, and the like, taking proper account of signs.

In the design of separating filters according to the present invention, it is convenient, as in general filter design, to neglect, as a first approximation, the higher order effects produced by the presence of resistances. The reason for this, as is explained, for example, in the said paper, entitled, "Ein Reaktanztheorem", is that the conditions required to be satisfied by the matrices of pure-reactance networks, if there are any physically realizable networks at all corresponding to such matrices, are particularly simple. The ohmic resistances produce a certain rounding-off of the attenuation curves of the networks; and the shape of this rounding-off may be modified in desired way by suitable choice of the resistances, which is particularly advantageous in the transmission range. This is known for known filter structures. Similar modifications are possible, also, in the shapes of the pure-reactance networks, according to the present invention. It will be understood that such modifications are part of this invention. It will accordingly be assumed that the networks hereinafter described contain pure reactances.

It is desirable at this point to mention also very important properties of a class of functions that are of great value in the design of filters according to the present invention,—the so-called "positive Q-functions", treated for example, by W. Cauer, "Ein Interpolationsproblem", Math. Zeitschr. 38, 1933, page 1. These functions have been used before in connection with the theory of four-terminal networks, as the basis of the design of image-impedance and attenuation functions; see, for example, W. Cauer, "Siebschaltungen", V. D. I. Verlag, 1931. It is possible to base the design of filters according to the present invention also upon these functions, here referred to as "attenuation functions". It will be well, therefore, to obtain some understanding of their properties.

These attenuation functions are functions of the frequency $f$, or of the frequency parameters $$\lambda = i\omega,$$

where $$\omega = 2\pi f,$$

and $i$ represents the imaginary, $$i = \sqrt{-1}$$

the notation being the same as in the above-mentioned papers. These attenuation functions may be represented as the square root of the product of two reactances, and are, for real frequencies, real in some intervals and pure-imaginary in the other intervals. The order of the real intervals $r$ (referred to as positive intervals in the said paper, entitled, "Ein Interpolationsproblem") and imaginary intervals $i$ on the positive axis of frequency defines the type of the function; the four most simple types, for example, may be designated by $(ri)$, $(ir)$, $(rir)$ and $(iri)$. These types are tabulated for $$\sqrt{Z_1 Z_2}$$

in the said "Siebschaltungen" for NDF, HDF, BSF and BDF, respectively, and in the said "Ein Interpolationsproblem" for TP, HP, BS and BP, respectively. Reference may be made also to the tables in Letters Patent of the United States 1,989,545, granted January 29, 1935. Between every real interval and the opposite imaginary interval there exists a "limiting frequency" or cut-off frequency. At every limiting frequency, the function assumes the value zero or infinity; and the function may have zeros and poles in the imaginary intervals. Along the axis of frequencies, the values zero and infinity alternate, so long as no real interval is passed. It is possible to choose the number of zeros and poles with a fixed type and fixed limiting frequencies; and this possibility of choice makes possible a division into classes. In the real intervals, the function is regular and may approach the value unity. The higher the number of the class, the greater the number of frequencies at which the function has the value unity and the better the approximation that the function may assume to the value unity. Assuming the class fixed, the approach to unity is dependent further upon the positions that may be chosen for the zeros and the poles, or the positions of the unity values of frequency. In brief, the attenuation function may be more closely defined by means of type, limiting frequencies, classes, poles and zeros. Certain matters of theory having now been discussed, it is in order to explain certain fundamental features of the invention.

If two or more second-order chief minor determinants of the impedance (or admittance) matrix of a passive network with three or more pairs of terminals $0, 1, \ldots n$ are nearly or exactly constant, so that, for example (as is assumed, in accordance with the invention),

(10) $\qquad Z_{ss}Z_{tt} - Z^2_{st} = R_s R_t,$ and if the terms of the matrix not appearing in those minors vanish, then the network constitutes a separating filter that attenuates between the pair of terminals $s$ and $t$ better and better as the relation

(11) $\qquad Z_{ss}Z_{tt} = R_s R_t$ is more nearly satisfied, and that passes better and better as the relation

(12) $\qquad \dfrac{Z_{ss}}{Z_{tt}} = \dfrac{R_s}{R_t}$ is more nearly satisfied. Stated otherwise, such a network constitutes a filter the open-circuit impedances (or short-circuit admittances) of which, at two or more pairs of terminals, approach reciprocity in the corresponding elimination range and proportionality in the corresponding pass range (or ranges).

The truth of the above statements with respect to postulates (11) and (12), for the most important working parameters, will now be shown to follow from Equations (4) to (9). In order, first, for Equations (10) and (11) both to be satisfied, $Z_{st}$ must approach the value zero. It follows from Equation (4) and, for the case of split filters, more simply from Equation (7), that a high attenuation will necessarily exist between the pairs of terminals $s$ and $t$. In order, secondly, for Equations (10) and (12) to be simultaneously satisfied, it follows from Equation (9) that the two open-circuit impedances of the network at $s$ and $t$ approach the values of the resistances at the end of the network; that is, $$W_{st} \rightarrow \text{ approaches } R_s \text{ and } W_{ts} \rightarrow$$

approaches $R_t$. Properties of such character, as is well known from even present-day filter-circuit theory, yield a filter having good pass bands and low reflection with small losses.

In the above demonstration, the open-circuit image impedances were employed instead of the working image impedances. This does not affect the argument because, in the pass range referred to, the paths to the remaining pairs of terminals are attenuated; and as very little current, therefore, passes to those remaining pairs of terminals, the connections to them may be entirely opened without substantially affecting the current distribution. A more rigorous demonstration may, however, be made, if desired, still with the aid of Equations (4) to (9). Equation (10), moreover, altogether by itself, and without the aid of any of the other equations, expresses the fact that the open-circuit impedances $$W_{st} \rightarrow \text{ and } W_{ts} \rightarrow$$

are reciprocal to each other, and it can be demonstrated that, in order to obtain good constituent filters, this relation must approximately obtain if Equation (11) holds approximately true in the elimination range and Equation (12) in the pass range. Therefore, it is sufficient, for the carrying out of the present invention, that the networks be of such character that the relations (11) and (12) are approximately satisfied.

In order to choose the open-circuit impedances in connection, for example, with the split filters illustrated in Fig. 1 and the ring filters illustrated in Fig. 2, it is convenient to call to aid certain auxiliary functions that, unlike the case of the open-circuit impedances, may be chosen substantially independently of one another out of the above-described attenuation functions.

In connection with split filters having a main pair of terminals $0$ and two or more secondary terminals $1, 2, \ldots n$, one needs to employ $n+1$ attenuation functions $$q_0, q_1, \ldots q_n$$

the imaginary intervals of which taken together extend over the whole axis of frequency. Their product may be abbreviated as follows:

$$\pi = q_0, q_1, \ldots q_n$$

To take an example, in the following matrix $z$, built up from these functions, $$(13) \quad \begin{Vmatrix} R_0\pi & \sqrt{R_0R_1(q_1^2-1)} & \cdot & \sqrt{R_0R_n(q_n^2-1)} \\ \sqrt{R_0R_1(q_1^2-1)} & \dfrac{R_1q_1^2}{\pi} & 0 & 0 \\ 0 & 0 & \cdot & 0 \\ \sqrt{R_0R_n(q_n^2-1)} & 0 & 0 & \dfrac{R_nq_n^2}{\pi} \end{Vmatrix}$$

it will be found that Equation (10) is satisfied for each second-order determinant, for which $$Z_{st} \pm 0$$

and it will further be found that Equations (11) and (12) for $s=o$ reduce, respectively, to the conditions that (11') $\quad q_t \approx 1$, in $E_t$ and (12') $\quad \dfrac{\pi}{q_t} \approx 1$ in $P_t$ where $E_t$ is the attenuation range between the terminals $0$ and $t$, and $P_t$ is the pass range between these terminals $0$ and $t$.

These relations may be satisfied by the use of proper attenuation functions under the following correlations:

(13') $\begin{cases} \text{The all-attenuation range } P_0 \text{ between } 0 \\ \text{and } i \text{ up to } n \text{ corresponds to an interval} \\ \qquad i \text{ of } q_0; \\ \text{The pass range } P_t \text{ between } 0 \text{ and } t \text{ corresponds to an interval} \\ \qquad i \text{ of } q_t; \text{ and} \\ \text{The elimination range } E_t \text{ between } 0 \\ \text{and } t \text{ corresponds to an interval} \\ \qquad r \text{ of } q_t. \end{cases}$ The all-attenuation range $P_0$, is the range of frequencies for which all currents are attenuated between the terminals $O$ at the one side and any other pair of terminals at the other side.

It is readily observed that condition (13') applies to relation (11'), for attenuation functions are already known that can be made to approach unity in the real interval. As for the relation (12'), it may be noted that every function in $P_t$ except $q_t$ is real, and that the product of such functions is consequently also real.

In order to be able physically to construct a network corresponding to the matrix (13), one must be able to find attenuation functions $q_t$ all of which, except $q_0$, shall fulfill the condition that $$\sqrt{q_t^2-1}$$

is a rational, real function of $\lambda$ for real values of $\lambda$. How to obtain proper such "allowable" functions will be described hereinafter.

There are no restrictions other than as above indicated imposed upon the function $q_0$; it may even, in the limiting case, assume the important value $$q_0 = a \text{ constant,}$$

yielding split filters without any "all-attenuation range", that is, split filters for which the range of all frequencies is distributed on the several pairs of secondary terminals, such as are illustrated in Figs. 10 to 13.

A further example will now be given of a matrix that will satisfy the relations (10) to (12) to produce the ring filter of Fig. 2a, as exemplified, for example, in Figs. 6a and 6b, having three pairs of terminals $1, 2$ and $3$ and pass ranges $P_{23}, P_{31}$ and $P_{12}$, these ranges extending over the whole axis of frequency, without overlapping. Three suitable functions $q_1, q_2$ and $q_3$ may be used, employing the imaginary intervals $P_{23}, P_{31}$ and $P_{12}$, for the purpose of setting up the following Z matrix:

$$(14) \quad \begin{Vmatrix} \dfrac{R_1q_2q_3}{q_1} & \sqrt{R_1R_2(q_3^2-1)} & \sqrt{R_3R_1(q_2^2-1)} \\ \sqrt{R_1R_2(q_3^2-1)} & \dfrac{R_2q_3q_1}{q_2} & \sqrt{R_2R_3(q_1^2-1)} \\ \sqrt{R_3R_1(q_2^2-1)} & \sqrt{R_2R_3(q_1^2-1)} & \dfrac{R_3q_1q_2}{q_3} \end{Vmatrix}$$

As in the case of the split filter above described, it will be found that Equation (10) is satisfied identically, and the establishment of the relations (11) and (12) is reduced to the task of approximating unity with those attenuation functions.

Matrices for the construction of ring filters with multiple terminals and for open-ring filters such as are illustrated in Fig. 3 may be set up in similar fashion.

The method of setting up these matrices being now understood, it will next be explained how to build filters of the desired types upon which are imposed specified requirements. This part of the exposition may be divided into two parts: first, the setting up of a matrix suitable to the said requirements; and secondly, the construction of the desired filter from the matrix so set up. The first part will now be taken up in connection with the design of the before-mentioned split filter without complete elimination range, where $$q_0 = a \text{ constant.}$$

The problem is:
Given the pairs of terminals $$0, 1 \ldots n;$$

(15) { the prescribed practical pass range $P_t'$;
the prescribed practical elimination range $E_t'$;

(16) the elimination requirement, the prescribed maximum attenuation $$A_{ot} \geq \overline{A_{ot}} \text{ in } E_t'; \text{ and}$$

(17) the pass-range requirement, the prescribed maximum attenuation $$A_{ot} \leq \overline{A_{ot}} \text{ in } P_t';$$

to design the filter, using given network impedances $R_0 \ldots R_n$.

It should be explained that the "practical" pass range and elimination range are narrower than the corresponding theoretical ranges $P_t$ and $E_t$, or the imaginary and the real intervals of the corresponding attenuation functions, because the attenuation can not be changed discontinuously.

One may choose any practical transmission range wholly at will, even in the form of several different frequency bands. It will here be assumed, however, that none of these bands will be transmitted at the same time to another pair of secondary terminals also. Every two ranges, therefore, will be separated by a transition or "dead" range. This transition range may theoretically be chosen as small as desired; but practically, one should bear in mind that the choice should not be such as to involve unnecessary lack of economy with respect to the number of the circuit elements of the filter, their accuracy and their losses. A practical elimination range should be constituted of the totality of transmission ranges belonging to the remaining pairs of secondary terminals, generally including the dead ranges between them. The transmission ranges, the elimination ranges, and the imaginary and the real intervals of the corresponding attenuation functions will conveniently be plotted on $n$ scales of frequency corresponding to the $n$ pairs of secondary terminals. Fig. 17, for example, contains such a plot for $n=2$. The impedances of the apparatus to which the filter is connected may be assumed to be approximately pure, constant, ohmic resistances in the corresponding pass ranges. A matrix satisfying the requirements (15) to (17) may be set up in three steps,
as follows: first, a determination of all the limiting frequencies; secondly, an individual determination of the $n$ attenuation functions; and finally, a construction of the matrix and its development by partial fractions.

To carry out the first step, involving a simultaneous determination of the limiting frequencies for all the attenuation functions, one may start out by interpreting the requirements (16) and (17) in terms of the approximation to unity of the $n$ attenuation functions, with the aid of Equations (4) to (9) and (13); or, more simply, with the aid of the other equations, that may be derived from them. Letting

(18) $\qquad 2\epsilon_t = |1 - q_t|$ in $E_t$, it follows that

(19) $\qquad A_t \geq \ln \dfrac{1}{\sqrt{1-q_t^2}} \geq \ln \dfrac{1}{2\sqrt{\epsilon_t}}$ in $E_t$ and

(20) $\qquad A_t \leq \sum_{j=0}^{n}{}' \ln q_j \leq 2 \sum_{j=0}^{n}{}' \epsilon_j$ in $P_t$ The $'$ following the $\Sigma$'s here indicates that $q_t$ or $\epsilon_t$, as the case may be, is omitted from the summation. In the case of split filters without the all-attenuation range, furthermore, where $$n = 2$$

it turns out that the working impedance is constant.

(21) $\qquad W_0 = R_0; \quad A_0 = 0.$

To find the necessary approximation to unity, it is sufficient to consider the requirement for elimination, because any approximation to unity that satisfies such requirement is certain, in all practical cases, to be more than sufficient to satisfy the requirement of passing. In every dead range between a pass band and an elimination band on the $n$ scales of frequency, furthermore, an intermediate frequency is chosen as the limiting frequency. Every dead range appears on two of the said scales and the same limiting frequency is adopted on each of the said two scales. This brings about the only connection between the $n$ attenuation functions; namely, that, in any case, one is imaginary, since the others are real. The approximate geometric means of the limits of elimination or of the pass limits (the limits of practical elimination and of the practical pass band) that border upon the dead range may conveniently be adopted as the said intermediate frequency. In those cases where the desired approximation to unity is higher on one side, it may be preferred not to approach so closely to that one side. Where the requirements are particularly exacting, the most suitable choice of limiting frequencies may be attained by a process of successive approximation. The limiting frequencies may be indicated, in order of magnitude, $\omega_1, \omega_2 \ldots$ as in Fig. 17.

The second step is to obtain single-valued attenuation functions that shall be in accordance with the limiting frequencies obtained by the first step, and that shall approximate to unity in the manner prescribed. It is desirable, at the same time, to employ a class number as low as possible, as a minimum number of circuit elements will then be necessary, according to the formula

(22) $\qquad n \sum_{t=1}^{n} g_t - \sum_{t=1}^{n} v_t,$ where $v_t$ is the number of limiting frequencies, and $g$ is the number of poles, or the number of positions at which $q_t$ has the value unity. In making the count, a pole or a unity position of $q_t$ at zero or at infinity are each counted once, and the others are counted double, assuming that positive frequencies only are considered.

In the interest of brevity, the further discussion will be restricted merely to the following normal case. The desired attenuation function is to have not more than two limiting frequencies. It belongs, therefore, to the four most simple types $ri$, $ir$, $rir$ and $iri$. A certain minimum attenuation, or minimum approximation $2\epsilon$ to unity furthermore, is to be attained equally in the practical elimination range.

For this normal case, the best possible attenuation functions are known. They are those functions of equal class number that attain the best approximation to unity in the prescribed range $E'$. These Tschebyscheff functions (see, for example, the said Letters Patent 1,989,545) may be obtained from the following Tables I and II, with the help of the plots of Fig. 16:

TABLE I

*Normalized attenuation functions with Tschebyscheff properties.*

| $g'$ | | $a$ | $b$ | $c$ | $d$ | $2\sqrt{\epsilon}$ |
|---|---|---|---|---|---|---|
| 1 | $\dfrac{\sqrt{\Omega^2-1}}{\Omega}$ | | | | | $k^{-1}$ |
| 3 | $\dfrac{(\Omega^2-a^2)\sqrt{\Omega^2-1}}{\Omega(\Omega^2-b^2)}$ | $\operatorname{sn}\dfrac{2K}{3}$ | $\operatorname{sn}\dfrac{K}{3}$ | | | $k^{-3}b^4$ |
| 5 | $\dfrac{(\Omega^2-a^2)(\Omega^2-c^2)\sqrt{\Omega^2-1}}{\Omega(\Omega^2-b^2)(\Omega^2-d^2)}$ | $\operatorname{sn}\dfrac{4K}{5}$ | $\operatorname{sn}\dfrac{3K}{5}$ | $\operatorname{sn}\dfrac{2K}{5}$ | $\operatorname{sn}\dfrac{K}{5}$ | $k^{-5}b^4d^4$ |

TABLE II

*Corresponding frequency transformations*

| Type | $ir$ | $ri$ | $rir$ | $iri$ |
|---|---|---|---|---|
| $\Omega$ | $\dfrac{\omega}{\omega_1}$ | $\dfrac{\omega_1}{\omega}$ | $\dfrac{\omega^2-\omega_1\omega_2}{\omega(\omega_2-\omega_1)}$ | $\dfrac{\omega(\omega_2-\omega_1)}{\omega^2-\omega_1\omega_2}$ |
| $g$ | $g'$ | $g'$ | $2g'$ | $2g'$ |

In these tables,
$\Omega$ represents a normalized frequency,
$k$ represents the normalized elimination limit (of E),
K is the complete elliptic integral of the first order, to the modulus $k^{-1}$,
sn is the Jacobian elliptic function,
$g'$, $g$ represent the class number of the attenuation functions, and
$1-2\epsilon$ is the minimum value of $q$ in E.

To form the desired attenuation functions, the elimination limits of the prescribed range E are to be normalized, as described, for example, in the said Letters Patent, according to the frequency transformation corresponding to their type and to their limiting frequencies on the basis of Table II; $k$ is the normalized limit (or the smaller limit if there are two such limits) so obtained. With the aid of Fig. 16, or the formulas in the last column of Table I, it is possible to determine which approximation to unity (or transmission attenuation A) $2\epsilon(A)$ can be obtained with the classes $g'=1, 3, 5$ above the normalized frequency limit $k$. The dashed-line curve 3' of Fig. 16, which was obtained without the use of the Tschebyscheffian function, indicates, by comparison with the corresponding Tschebyscheff curve 3, the improved results obtainable by this method. In practice, the lowest class 1 is usually not very favorable. Class 3 is better and class 5 better still. If, however, even class 5 should be found not to be sufficiently satisfactory, higher classes still can be found; but it is often better not to resort to higher classes, but to supplement the elimination attenuation found as described above with the addition of a filter at the corresponding pair of secondary terminals. Using the normalized function $q$ corresponding to the chosen class number obtained from Table I, the transformed frequency obtained, as described above, from Table II may be used instead of $\Omega$, whereupon the desired attenuation function will be obtained. The class number of this attenuation function will be found in the last row of Table II. The K corresponding to the $k$ thus found will be taken from a table of elliptic integrals, and the values $$\operatorname{sn}\frac{K}{3}$$

etc., from a table of elliptic functions.

The normalized Tschebyscheffian functions have the following characterizing properties. They pass between $1-2\epsilon$ and 1 for $\Omega \geq k$, and attain a maximum unity position at frequencies corresponding to each pole, and a minimum (value $1-2\epsilon$) at frequencies corresponding to each zero, in such fashion that the product of the corresponding normalized frequencies is always equal to $k$. In the limiting case, a pole at zero frequency and a frequency of unity at infinity correspond to each other. It follows from this and the relation (13) that at that pair of terminals, the corresponding attenuation function of which is a Tschebyscheff function, the common poles of the open-circuit impedances (or short-circuit admittances) in the corresponding pass range are paired with the poles of the corresponding working attenuation in such a way that the product of every pair of normalized frequencies is approximately equal to the normalized attenuation limit.

Assuming, now, that the attenuation functions $q_1 \ldots q_n$ have been found, the third and last step is to find the characteristic matrix (13) from these functions, and to develop it into partial-fraction matrices. Such partial-fraction development is obviously possible because every term of the matrix (13) is a rational function if the attenuation functions are determined as before described and may, therefore, be represented, according to well known methods, as a sum of partial fractions. Corresponding to the possible poles at zero and finite frequencies and at infinity, it is possible to represent $Z_{st}$ in partial fractions only of the form

(23) $\quad h_{st}^{(0)} \lambda^{-1}, \; h_{st}^{(r)} \dfrac{\lambda}{\lambda^2+\omega_r^2}, \; h_{st}\infty\lambda,$ the constant $h_{st}$ having the values obtained by computation. A check control of the computation may be had from the fact that, for all these constants, because of the relation (10),

(24) $\quad h_{00}h_{tt}-h_{0t}^2=0, \; t=1, \ldots n.$

An easier method of computing the terms $$Z_{0t},\; t=1, \ldots n\;.$$

arises from the fact that their poles are the poles of $q_t$, and their zeroes are the positions of unity frequency of $q_t$, and both these latter may easily be found if, indeed, they are not already known from the calculation of the attenuation functions.

It has now been shown how to calculate the matrix for the case of the split filters without all-attenuation range. The calculation of the corresponding matrices for split filters including an all-attenuation range, where only a single attenuation function, $q_0 \pm a$ constant, has to be added in, and the calculation for ring filters according to the matrix (14), will present no difficulties to persons skilled in the art, in view of the description above.

This completes the first part of the before-mentioned exposition. It remains to describe the second part, namely, the construction of the desired filter from its matrix.

If all that is primarily desired is to build some network corresponding to its matrix, all that one needs to do is to adopt the "canonical network" described in the said paper, entitled, "Ein Reaktanztheorem", calculating the circuit elements as there described. In this manner, one may obtain composite networks such as are illustrated in Figs. 5a, 6a and 7a, containing as many constituent four-terminal networks as there are reversible lines of communication, connected together in series at one side.

Each of the oblongs of Figs. 5, 6 and 7, some of which are marked $q_1$, $q_2$ and $q_3$, represents a four-terminal network having a pair of input terminals and a pair of output terminals. Each pair of input terminals may, of course, be employed as the output terminals of the corresponding network, in which case the output terminals shown would be used as the input terminals. In Fig. 5, the main terminals are indicated at (0) and the secondary terminals are (1) and (2); in Fig. 6, there are shown three pairs of main terminals (1), (2) and (3). The networks of Fig. 7 are shown provided with two pairs of main terminals (2) and (3) and two pairs of secondary terminals (1) and (4). The networks $q_1$ and $q_2$ of Fig. 5 are connected between the main terminals (0) and the secondary terminals (1) and (2), the networks of Fig. 5a being connected in series, and those of Fig. 5b in parallel, as before stated. The networks $q_1$, $q_2$ and $q_3$ of Fig. 6 are similarly connected between the terminals (1), (2) and (3), a series connection being shown in Fig. 6a and a parallel connection in Fig. 6b. The connections of Figs. 7a and 7b will be understood without further description.

The following low-and-high-pass separating filters without all-attenuation range, for example, corresponding to the class number of their attenuation functions, may be obtained:

| Class $i\overline{r}$ | $ri$ | Illustrated in Fig. |
|---|---|---|
| 1 | 1 | 9a |
| 3 | 1 | 10a |
| 1 | 3 | 11a, 11c |
| 3 | 3 | 12a |
| 5 | 5 | 13a |

As before stated, Fig. 9a represents a complex potentiometer of the prior art, but Figs. 10a, 11a, 11c, 12a and 13a represent novel filters embodying the present invention.

In order to show at a glance the relation between the network and the attenuation functions on the frequency scales of Figs. 10 to 13, their poles are indicated by crosses and their zeros by small circles. They are both found as resonance frequencies of the oscillation circuits in their corresponding networks, as will be understood from the following. Every pole of $q_1$ originates an oscillation circuit in the shunt branch of the four-terminal network 0, 1, and every zero originates an oscillation circuit in the series branch of the other four-terminal network 0, 2, and vice versa. The oscillation circuits in the shunt branch couple the mesh through the pair of terminals 0 with the mesh through the secondary pair of terminals 1 or 2. This may be effected by suitable arrangement (as, for example, according to a rising frequency) in alternatively opposite senses.

If, in addition, it is desired that the same matrix shall yield a physical network realization as an admittance matrix, it is possible to construct a reciprocal four-terminal network corresponding to each of the above-described partial four-terminal networks. Those reciprocal networks will then be connected reciprocally, as illustrated in Figs. 5b, 6b and 7b. There is no difficulty involved in constructing the reciprocal networks, for it is possible, in many ways, to construct a reciprocal four-terminal network corresponding to any other four-terminal network V. As one illustration, one may set up the admittance matrix of V and construct an impedance matrix therefrom, by means of the canonical circuit of the said "Ein Reaktanztheorem". There are a few cases of trivial importance where V does not have an admittance matrix; where V is equivalent to an ideal transformer with a two-terminal network Z shunted to the secondary terminals. Even in such case, however, the ideal transformer, with reciprocal transformation ratio, will become the reciprocal of a two-terminal network reciprocal to Z connected in series with one of its secondary terminals.

Branch by branch, the networks of Figs. 10b to 13b are reciprocal to the networks of Figs. 10a to 13a. Corresponding to the tightly coupled coils of Figs. 10a to 13a which, as before explained, are indicated by dashed circles, Figs. 10b to 13b illustrate ideal transformers, indicated, as before described, by three lines, that are connected, on one side, by series-connected oscillation circuits.

The primary winding of the transformer shown in Fig. 10b, for example, is shown connected across the main terminals (0). One end of the secondary winding is connected to one of the main terminals (0), to one end of this primary winding and to one of the secondary terminals (1) and (2). The other end of the secondary winding is connected, through a condenser and a coil of the oscillation circuit $a$, to the other secondary terminal (1). The said coil is shown connected with a coil marked 0, which is connected to the said other secondary terminal (1) and to the other main terminal (0). Similar remarks apply to Figs. 11b, 11d, 12b and 13b.

In Fig. 10a, on the other hand, the primary and the secondary windings of the tightly coupled transformer of the oscillation circuit $a$ are shown connected together in a series circuit between one of the terminals (1) and one of the terminals (2), with the junction between them connected, through a condenser marked 0, to one of the main terminals (0). A condenser is shown connected in parallel to the secondary winding of this tightly-coupled transformer in the oscillation circuit $a$.

The primary winding of this tightly coupled transformer is shown connected, not only to one of the secondary terminals (2), but also, through a coil, marked ∞, to the other main terminal (0). The oscillation circuit $b$ is connected between the last-named main terminal (0) and the other secondary terminal (2).

Figs. 11a, 11c, 12a and 13a will now be understood without further description.

Figure 11B:
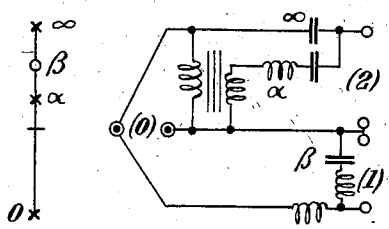
Figure 11C:
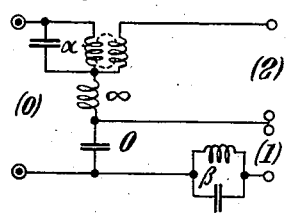
Figure 11D:
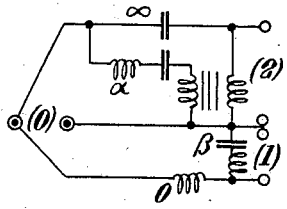
Figure 12A:
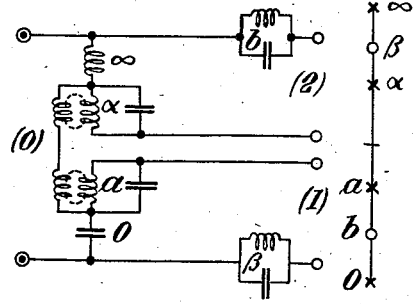
Figure 12B:
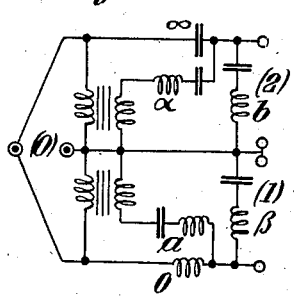
Figure 13A:
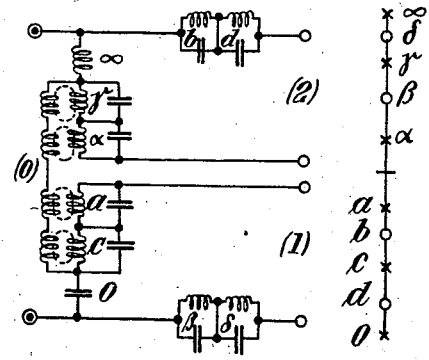
Figure 13B:
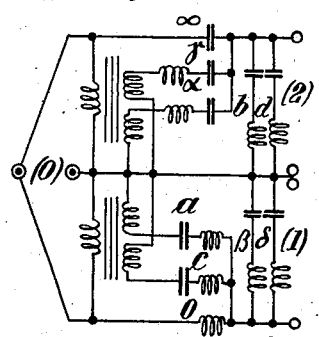
Figure 14A:
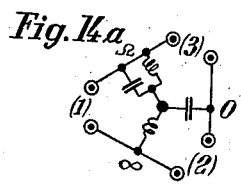
Figure 14B:
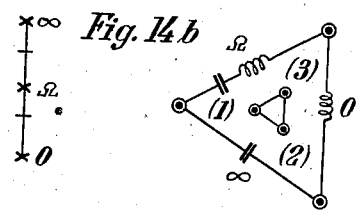

With suitable choice of circuit elements, the networks of Figs. 11a and 11c, as well as those of Figs. 11b and 11d, may be made entirely equivalent. These equivalencies are not so important as many others that may not, on the surface, appear to be equivalent, but which calculation will demonstrate to be so. Such calculation is described in the above-cited paper, entitled, "Aequivalenz von 2n-Polen".

The networks illustrated in Figs. 10 to 13 correspond to the case where the resistances connected to the networks are equal:

$$R_0 = R_1 = R_2$$

If these resistances are not equal, the network may be changed, in a known way, as by the addition of transformers, or by changing the circuit elements, or the transmission relations of the coupled coils, or of the ideal transformers, so as to bring about this equality of the resistances.

An example will now be given to explain the procedure involved in the design of a filter. The circuit elements will be computed in two different forms of the design.

Let it be proposed to design a split filter having two pairs of secondary terminals in the practical transmission ranges $$P_1: 0 \text{ to } 50 Hz, \quad P_2: 300 \text{ to } \infty Hz$$

The practical elimination ranges are to be the reverse of these. The minimum attenuation must be $$A = 4 \text{ napiers}$$

(It should be observed that to prescribe the highest attenuation in the pass bands has meaning only when the influence of the time constants of the circuit elements is evaluated in a manner that is known to be suitable for four-terminal networks. For separating filters according to the present invention will satisfy, the most nearly to the ideal, the requirements of the problem of passing, employing ideal circuit elements.) The resistances to which the filters are to be connected will have a value of 1000 ohms.

As before indicated, the problem is to be solved in two parts, the first part involving three steps.

Proceeding, then, to the first part of the problem, the setting up of a suitable matrix, the first step is to determine the limiting frequency. This may be chosen at about the geometric mean of the limits of the dead range, say, $$\omega_1 = 800 (\text{sec}^{-1})$$

The next step is to determine the two attenuation functions $q_1$ and $q_2$. The former is of the $(ir)$ type and the latter of the $(ri)$ type. It must be assured that they shall have equally high minimum approximation to unity throughout the practical elimination ranges. As this is the normal case, these attenuation functions may be taken from Tables I and II. After the normalization of the frequency, it may be observed from Fig. 16 that the requirements will be fulfilled by functions that are both of class 3.

$$\Omega = \frac{\omega}{800(\text{sec}^{-1})} \text{ for } q_1, \text{ and}$$

$$\Omega = \frac{800(\text{sec}^{-1})}{\omega} \text{ for } q_2$$

For example, $$k^{-1} = 0.52$$

$A = 4.6$ napiers beyond the 66 and 245 $Hz$

The shape of the attenuation curve obtained with this choice of the parameters is illustrated in Fig. 15b. (If ideal circuit elements were employed, the highest attenuation in the pass range, according to Formula (20), would be $$\bar{A} < 2\epsilon < 10^{-4} \text{ napiers}$$

The input attenuation is zero, as is always the case when $$n = 2$$

and $$q_0 = a \text{ constant.})$$

After the determination of K corresponding to the chosen $k$, the following attenuation functions will be obtained from Tables I and II:

$$q_1 = \frac{(\lambda^2 + \omega_b^2)\sqrt{\lambda^2 + \omega_1^2}}{\lambda(\lambda^2 + \omega_a^2)}$$

$$q_2 = \frac{\omega_\alpha^2 \sqrt{\lambda^2 + \omega_1^2}(\lambda^2 + \omega_\beta^2)}{\omega_1 \omega_\beta^2 (\lambda^2 + \omega_\alpha^2)}$$

Where $$\omega_1^2 = 64 \times 10^4 (\text{sec}^{-1})$$

$$\omega_b^2 = 17.9 \times 10^4 (\text{sec}^{-1})$$

$$\omega_a^2 = 49.8 \times 10^4 (\text{sec}^{-1})$$

$$\omega_\alpha^2 = 82.0 \times 10^4 (\text{sec}^{-1}) \text{ and}$$

$$\omega_\beta^2 = 228.0 \times 10^4 (\text{sec}^{-1}).$$

The third step is to form the characteristic matrix (13) and develop it in partial fractions:

$$\begin{Vmatrix} q_1 q_2 & \sqrt{q_1^2 - 1} & \sqrt{q_2^2 - 1} \\ \sqrt{q_1^2 - 1} & \dfrac{q_1}{q_2} & 0 \\ \sqrt{q_2^2 - 1} & 0 & \dfrac{q_2}{q_1} \end{Vmatrix} \times 1000 \text{ ohms.}$$

The development into partial fractions will yield the $Z_{st}$ terms according to Formula (23); they will have the following numerical values:

| st | $h_{st}(0)$ | $h_{st}(b)$ | $h_{st}(a)$ | $h_{st}(\alpha)$ | $h_{st}(\beta)$ | $h_{st}(\infty)$ |
|----|---|---|---|---|---|---|
| 00 | 288 |  | 225 | 289 |  | 0.000 45 |
| 01 11 | 288 288 |  | −241 258 |  | 1,670 |  |
| 02 22 |  | 470 |  | −309 330 |  | 0.000 45 0.000 45 |

As a control check upon the computation, $$225 \times 258 - 241^2 \text{ and}$$

$$289 \times 330 - 309^2$$

should vanish, as demanded by Equation (24).

As for the second part of the design, the physical construction of the impedance matrix, the canonical network of the "Ein Reaktanztheorem" is illustrated in Fig. 12a, having the following numeral values for the capacitances, inductances (in the tightly coupled coils at $a$ and $\alpha$, that coil which is turned towards the pair of secondary terminals) and the transformation ratios $t$:

| Fig. 12a | 0 | b | a | α | β | ∞ | Fig. 12b |
|---|---|---|---|---|---|---|---|
| C(μF) | 3.47 | 2.13 | 3.88 | 3.02 | 0.597 | | L(H) |
| L(H) | | 2.62 | 0.52 | 0.403 | 0.73 | 0.45 | C(μF) |
| t | | | −0.934:1 | −0.934:1 | | | t=1 |

In order that the same matrix may serve as an admittance matrix, one may employ the network of Fig. 12b which, branch for branch, is the reciprocal of the network of Fig. 12a. As the numerical values of the circuit elements are the same as for Fig. 12a, except for the interchange of coils and condensers, they may be found from the same table, and this is so indicated in the table.

Now that the straight design of the separating filters of the present invention has been described, several further concepts relating to the invention may be mentioned. Among these are the construction of new filters of constant impedance, the solution of more complicated separating filter problems through a combination of simple separating filters embodying the invention, with each other or with ordinary filters, and applications to communication engineering.

As before stated, the split filters above described have a working impedance at their pair of main terminals that is constant, or approximately so, for all frequencies ($n=2, q_0=a$ constant) or, at least, for all transmission ranges (in all other cases), and this wholly independent of whether sending or receiving apparatus or, in some cases, corresponding ohmic resistances are connected in parallel to the secondary pairs of terminals. This concept leads to a new type of four terminal filter of one-sided constant impedance, comprising a separating filter embodying the present invention, as above described, and one or more ohmic resistances that are adapted to the secondary pair or pairs of terminals for the transmission ranges not required. As the working impedance of the split filters of the present invention, and also at every pair of secondary terminals, at least in the corresponding transmission range, is nearly constant, it is possible to construct further filters having a nearly constant working impedance in both the elimination and the transmission ranges and at both pairs of terminals. This may be effected by connecting two filters of the above-described character (having equal transmission ranges) with that pair of secondary terminals for which the impedance is constant only in the transmission range. In that way, it is possible to choose suitable filters that shall have like behavior in the transmission range and that complement each other's behavior to complete the operation of the filter in the attenuation range. Moreover, one may usually find filters that are obviously equivalent to such filters, but having fewer circuit elements. If, for example, the separating filter shown in Fig. 12a is connected on the right side, but reflected, as in a mirror, to the secondary pair of terminals 2, a high-pass filter will be produced; it being understood, of course, that both circuits marked b may be replaced by a single circuit.

It follows further from the constancy of the working impedance that the constituent separating filters of the present invention, as well as the composite filters constructed with their aid, may be combined in multiple manner with other filters without disturbing their individual action, notwithstanding that ordinary known reactance filters disturb one another. Two or more constituent separating filters embodying this invention may be so connected that one or more constituent separating filters shall be coupled to one or more pairs of terminals of another constituent separating filter. In this manner, by connecting, for example, simple split constituent filters in cascade, one may obtain a more refined division of frequencies as in Fig. 4a, or one may construct a ring filter out of four split filters, as in Fig. 4b. Many such may be produced. It is further possible to build composite separating filters from more simple networks that are computed wholly independently of each other. Thus, composite filters may be constituted of several split filters embodying this invention, with their pairs of main terminals coupled together. It is immaterial whether the pairs of main terminals of the partial network are connected together in series or parallel or a combination of series and parallel connections; in any such event, they react upon each other as little as in the well known combinations involving the use of vacuum tubes, but they have the advantage over the latter that the direction of communication may be reversed. The invention also indicates the use of separating filters, unlike some of those above described, in which the several transmission ranges may be caused to overlap. By combining constituent separating filters embodying the present invention with other like filters, finally, and also with filters the working impedances of which are constant on both sides, composite separating filters may be produced with absolutely arbitrary relations of communication between their pairs of terminals.

The design and construction of separating filters with exacting requirements as to elimination will be rendered easier if the elimination of a separating filter embodying the invention is improved by connecting four-terminal networks to one or more of its pairs of terminals. It is here advantageous to employ filters having adapted image impedances and complementary attenuation characteristics. Among others, those filters may be conveniently chosen that are produced from split filters by open-circuiting (or, in the case of the reciprocal filters, short-circuiting) one or more secondary pairs of terminals that are otherwise of no particular interest. The elements that then become superfluous will, of course, be omitted.

Of the numerous applications of filters embodying the invention, especially in communication, those are particularly to be noted where essentially good transmission is required. A multiplex communication system may comprise two separating filters $W_1$ and $W_2$ connected, as shown in Fig. 18, with two single-sided amplifiers, so as to yield an intermediate amplification, without a balancing network, in the so-called double-wire set. Such a system may be greatly improved by means of the present invention.

Further modifications within the spirit and scope of this invention will occur to persons skilled in the art without further description. It is therefore desired that the appended claims be broadly construed, unlimited except insofar as limitations may be necessary to be imposed by the state of the prior art.

What is claimed is:

1. A composite filter having more than two pairs of terminals and comprising a plurality of sections connected between the terminals and that are not themselves complete filters, certain of the sections being complementary to others of the sections to render them and the said complementary sections complete filters, the open-circuit impedances or the short-circuit admittances of the filter at at least two pairs of pairs of the terminals being approximately reciprocal in the corresponding practical attenuation band and being approximately proportional in the corresponding practical pass range.

2. A composite filter having more than two pairs of terminals and comprising a plurality of four-terminal networks connected between the terminals, the four-terminal networks lacking sufficient circuit elements to render them complete filters, some of the four-terminal networks containing circuit elements of such nature that they are complementary to others of the four-terminal networks to render them and the said complementary networks complete filters, the open-circuit impedances or the short-circuit admittances of the filter at at least two pairs of pairs of the terminals being approximately reciprocal in the corresponding practical attenuation band and being approximately proportional in the corresponding practical pass range.

3. A composite filter as defined in claim 1, the ratio of the open-circuit impedances at at least two pairs of pairs of the terminals in the transmission range being approximately equal to the ratio of the resistances to which the filter is connected, and the product of the open-circuit impedances at at least two pair of pairs of the terminals in the attenuation range being approximately equal to the product of the resistances to which the filter is connected.

4. A composite filter as defined in claim 1, the ratio of the short-circuit admittances at at least two pairs of pairs of the terminals in the transmission range being approximately equal to the ratio of the conductances to which the filter is connected, and the product of the short-circuit admittances at at least two pairs of pairs of the terminals in the attenuation range being approximately equal to the product of the conductances to which the filter is connected.

5. A composite filter as defined in claim 1, the number of the common zeros and poles of the open-circuit impedances or the short-circuit admittances at at least one pair of pairs of the terminals being greater in the corresponding transmission range the more closely the limiting frequencies are approached.

6. A composite filter according to claim 1 having a one-sided working impedance approaching constancy in the transmission and elimination ranges.

7. A composite filter as defined in claim 1 having a one-sided working impedance approaching constancy in the transmission and elimination ranges combined with another filter of the same description, the filters being connected together at some pairs of terminals in order to build a four terminal filter, said four terminal filter having a working impedance substantially constant for all frequencies at both pairs of terminals.

8. A composite filter as defined in claim 1 combined with two or more filters of the same type, one or more of the filters being connected with others of the filters at one or more pairs of the terminals.

9. A composite filter as defined in claim 1 combined with one or more filters of the same type, one or more pairs of terminals of each filter being main terminals at which there are a plurality of ways of communication, and the main pairs of terminals being connected together.

10. A network comprising amplifying means and two filters as defined in claim 1 for intermediate amplification in the two-band two-wire system of communication, the ratio of the open-circuit impedances of one of the filters at at least two pairs of pairs of the terminals in the transmission range being approximately equal to the ratio of the resistances to which the filter is connected and the product of the open-circuit impedances at at least two pairs of pairs of the terminals in the attenuation range being approximately equal to the product of the resistances to which the filter is connected.

11. A network comprising amplifying means and two filters as defined in claim 1 for intermediate amplification in the two-band two-wire system of communication, the ratio of the short-circuit admittances of one of the filters at at least two pairs of pairs of the terminals in the transmission range being approximately equal to the ratio of the conductances to which the filter is connected, and the product of the short-circuit admittances at at least two pairs of pairs of the terminals in the attenuation range being approximately equal to the product of the conductances to which the filter is connected.

12. A composite filter having more than two pairs of terminals and comprising a plurality of sections connected between the terminals, the poles which are common to both the open-circuit impedances or the short-circuit admittances at one or more pairs of pairs of terminals in the corresponding transmission range forming pairs with the poles of the corresponding working attenuation, the last-named pairs being so related that the product of every pair of normalized frequencies is approximately equal to the normalized attenuation limit.

13. A composite filter as defined in claim 1, the common zeros and poles of the open-circuit impedances or the short-circuit admittances at one or more pairs of terminals being spaced in the practical transmission range approximately the same distance apart.

14. A composite filter as defined in claim 1, comprising a plurality of four-terminal reactance networks connected in single-sided series connection, one or more of the pairs of terminals being main terminals at which there are a plurality of ways of communication, there being at each pair of main terminals as many ways of communication as there are four-terminal networks connected.

15. A composite filter as defined in claim 1, comprising a plurality of four-terminal reactance networks connected in single-sided parallel connection, one or more of the pairs of terminals being main terminals at which there are a plurality of ways of communication, there being at each pair of main terminals as many ways of communication as there are four terminal networks connected.

16. A composite filter as defined in claim 1, at least one of the pairs of pairs of terminals being connected by several impedances tuned to frequencies belonging to the corresponding transmission range, the impedances, according to the magnitude of their resonance frequencies, having alternatingly opposite couplings, and a parallel oscillation circuit connected in series with one or more pairs of terminals not connected to the said impedances and having a resonance frequency between every two neighboring resonance frequencies of the said coupling impedances.

17. A composite filter as defined in claim 1, at least one of the pairs of pairs of the terminals being connected by several impedances tuned to frequencies belonging to the corresponding transmission range, the impedances, according to the magnitude of their resonance frequencies, having alternatingly opposite couplings, and a series oscillation circuit connected in parallel with one or more pairs of terminals not connected to the said impedances and having a resonance frequency between every two neighboring resonance frequencies of the said coupling impedances.

18. In combination with a composite filter as defined in claim 1, one or more four-terminal filters connected in cascade with some of the pairs of terminals.

WALTER BRANDT.
WILHELM CAUER.